Patented June 5, 1923.

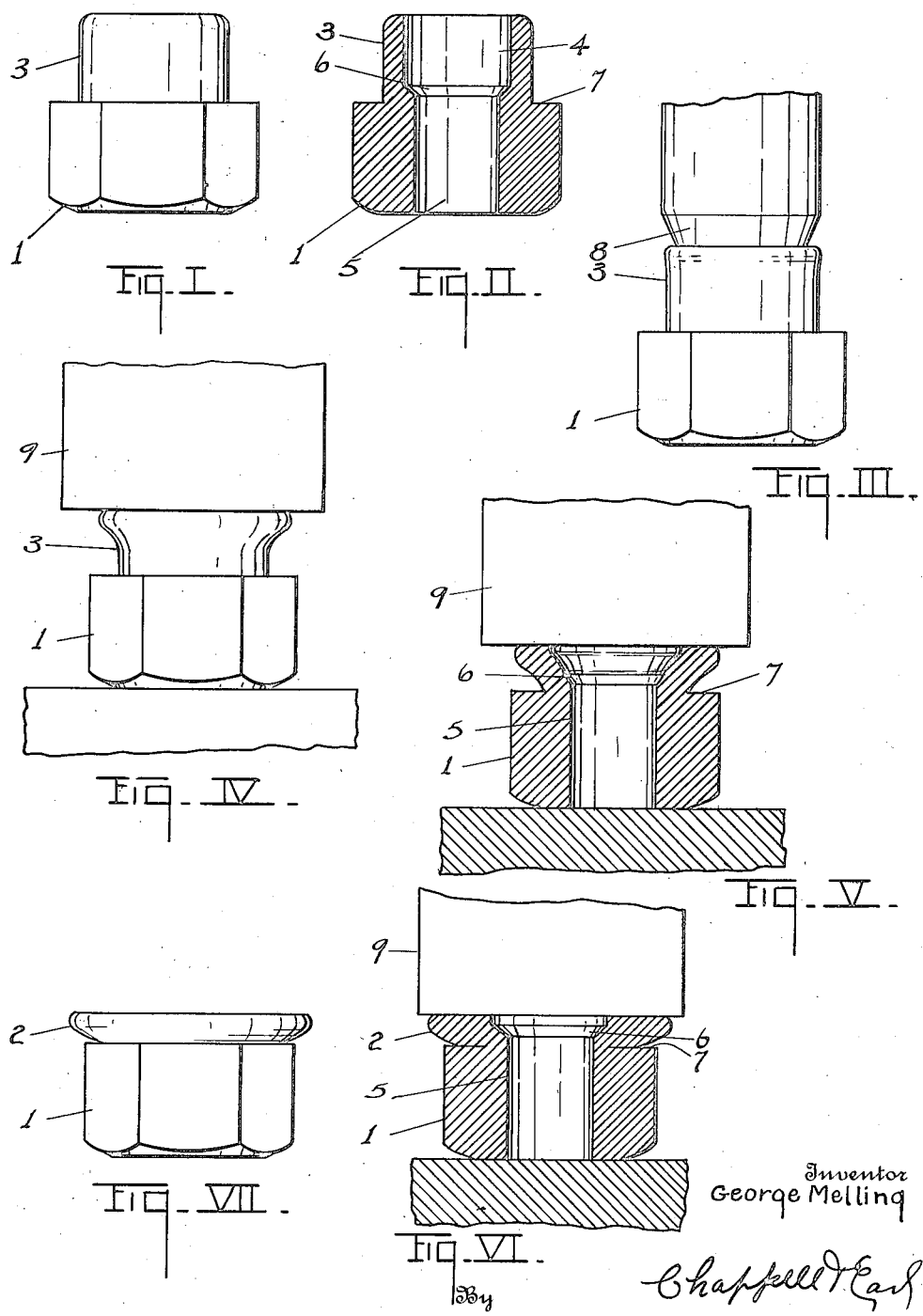

1,457,914

UNITED STATES PATENT OFFICE.

GEORGE MELLING, OF LANSING, MICHIGAN.

PROCESS OF MAKING FLANGED NUTS.

Application filed February 1, 1921. Serial No. 441,541.

*To all whom it may concern:*

Be it known that I, GEORGE MELLING, citizen of the United States, residing at Lansing, county of Ingham, State of Michigan, have invented certain new and useful Improvements in Processes of Making Flanged Nuts, of which the following is a specification.

This invention relates to improvements in flanged nuts, and the method of making the same.

The main objects of this invention are:

First, to provide an improved flanged nut.

Second, to provide an improved method of making flanged nuts whereby a superior article may be rapidly and economically produced.

Further objects, and objects relating to structural details will definitely appear from the detailed description to follow.

I accomplish the objects of my invention by the devices and means described in the following specification. The invention is clearly defined and pointed out in the claim.

A structure which is the preferred embodiment of my invention is clearly illustrated in the accompanying drawing forming a part of this specification, in which:

Fig. 1 is a side elevation of a nut blank, illustrating the first step of my improved method.

Fig. 2 is a vertical central section through the nut blank shown in Fig. 1.

Fig. 3 is a side elevation illustrating another step of the method, the expanding tool being partially broken away.

Fig. 4 is a detail side elevation showing still another step in the method of manufacturing the expanding and upsetting tool and the bed being partially broken away.

Fig. 5 is a detail partially in vertical section, further illustrating the method.

Fig. 6 is a detail view partially in vertical section corresponding to Fig. 5, showing the flange completely formed and upset.

Fig. 7 is a side view of the complete nut.

In the drawing similar reference characters refer to similar parts throughout the several views.

Referring to the drawing, 1 represents the body of completed nut having the flange 2. See Fig. 7.

In the manufacturing of the nut I first form the body 1 with a cylindrical tubular extension 3 of less diameter than the body and having a bore 4 of a greater diameter than the bore 5 of the body of the nut.

The shoulder 6 formed by these bores of different diameters is at the outside of, and spaced from the plane of the inner end 7 of the nut body. This tubular extension is expanded and upset into the flange 3. This upsetting and expanding is effectively accomplished by first expanding the outer end of the extension from the inside, as by means of the tapered tool 8 into the flaring form shown in Figs. 3 and 4.

The extension is further upset and expanded by means of the flat faced tool or press 9 engaging the end of the extension and expanding and upsetting the same until the extension is in the form of the flange 2 resting upon the end 7 of the nut with its outer edge projecting beyond the nut.

By this method flanged nuts may be very rapidly and economically produced.

The flange requires no trimming or shaping, and it has the desired body and strength for the usual requirements.

I have illustrated the means for expanding and upsetting the extension to form the flange conventionally, as the machine or press employed, forms no part of my invention.

Having thus described my invention, what I claim as new and desire to secure by Letters Patent is:

The method of making flanged nuts consisting of forming a body blank with a tubular extension at one end of a diameter less than the body, and expanding and upsetting the extension into a flange lying against the end of the body.

In witness whereof, I have hereunto set my hand and seal in the presence of two witnesses.

GEORGE MELLING. [L. S.]

Witnesses:
MABEL E. DOBSON,
CARL H. REYNOLDS.